United States Patent [19]

Fagard

[11] Patent Number: 4,838,647
[45] Date of Patent: Jun. 13, 1989

[54] DISPLAY DEVICE WITH A DISSOCIABLE STRUCTURE, PARTICULARLY FOR AIRCRAFT

[75] Inventor: Pierre Fagard, Montigny Le Bretonneux, France

[73] Assignee: Societe Francaise d'Equipements pour la Navigation Aerienne (S.F.E.N.A), France

[21] Appl. No.: 125,664

[22] Filed: Nov. 25, 1987

[30] Foreign Application Priority Data

Nov. 28, 1986 [FR] France ................................ 86 16620

[51] Int. Cl.⁴ ............................................ G02B 27/14
[52] U.S. Cl. .................................................... 350/174
[58] Field of Search .............................. 350/174, 252; 358/250–255

[56] References Cited

U.S. PATENT DOCUMENTS 2,496,928  2/1950  Bing et al. ........................... 350/252
4,060,835  11/1977  Gdovin ................................ 350/174

Primary Examiner—John K. Corbin
Assistant Examiner—Jay Patrick Ryan
Attorney, Agent, or Firm—William A. Drucker

[57] ABSTRACT

The invention provides a display device with dissociable structure, making it possible for a user to observe a synthetic light image superimposed in his natural field of vision, said device being formed as two dissociable modules, namely: an image generating module having, inside a case, at least one part of the image generating members and a removable optical module including a support element to which is fixed a curved mixer type optical mount including, in a dihedral configuration, a flat semitransparent mirror and a curved semitransparent mirror.

4 Claims, 2 Drawing Sheets

DISPLAY DEVICE WITH A DISSOCIABLE STRUCTURE, PARTICULARLY FOR AIRCRAFT

BACKGROUND OF THE INVENTION

The present invention relates to a display device making it possible for a user to observe a synthetic light image superimposed in his natural field of vision.

Numerous devices of this kind are already known, which can be used in vehicles and, in particular, in aircraft.

These devices usually called head up sights or head down sights depending on their implantation necessarily comprise a means for forming an image such, for example, as a cathode ray tube or a liquid crystal cell, this means being mounted on a support fixed to the vehicle, and an optical mount including collimation means as well as at least one partially reflecting mirror which extends into the field of vision external to the user for making said superimposition possible.

Of course, the means for forming the image must be connected by electrical connections to an electric power supply source and/or to a symbol generating device. In wide angle sights, the optical mount is necessarily bulky and consequently space consuming.

When they are fixed permanently and are not used, these devices become particularly troublesome. Besides the disadvantages resulting directly from the space they take up in the restricted volume of the piloting cabin, they partially attenuate the vision of the pilot towards the outside.

This is why users frequently ask for the possibility of retracting these devices when their use is not necessary.

Now, that implies the provision of a structure with appropriate kinematics to make such retraction possible and guaranteeing strict positioning of the optical mount during use. Furthermore, the problem raised by the electric connections of the image forming member, during such retraction, must be solved.

All these requirements lead then very often to heavy and bulky devices, difficult to integrate in small aircraft.

SUMMARY OF THE INVENTION

The invention overcomes these drawbacks by providing a display device of the above defined type but made in the form of two dissociable modules, namely:

an image generating module including at least one part of said image generating means, this module having means for permanently fixing it to the vehicle, and a removable optical module including at least one semireflecting element which extends into the field of vision external to the user, this optical module being couplable to the image generating module and being fixed by means of easily connectable and disconnectable rapid locking means.

Thus, with the dissociable structure described above it becomes possible, when the display device is not in use, to remove the optical module which forms the bulkiest part.

There only then remains the symbol generating module which, because of its small dimensions, is less troublesome for the user.

More precisely, the symbol generating module may include a case containing the usual optical or opto-electronic members for generating the light symbols which it is desired to superimpose on the vision of the user, this case having one coupling face with an orifice closed by an optically transparent element, through which light rays emitted by the symbol generator pass.

In this case, the optical module includes a support element on which said semireflecting element is fixed, this support being provided with centering and locking elements making possible the rapid and readily disconnectable fixing thereof to the coupling face of the case.

Advantageously, the rapid locking means may be formed by a bayonet coupling. In this case, one of the two modules may include at least one bayonet, whilst the other module will include at least one substantially circular ramp on which said bayonet may abut.

The invention may further include a protection and handling holder in which the optical module may be housed when the display device is not used, this holder being shaped so as to allow coupling to or uncoupling of the optical module in contains from an image generating module.

For this, this holder will then have to have an orifice situated at the level of the coupling face of the optical module which it contains as well as a readily disconnectable rapid locking means acting on corresponding locking means provided on the support element of said module.

Advantageously, the locking means used may be provided so that locking of the optical module to the image generating module causes unlocking of this optical module from its holder and, conversely, locking of the optical module in its holder causes unlocking of this optical module from the image generating module.

BRIEF DESCRIPTION OF THE DRAWINGS

Embodiments of the invention will be described thereafter, by way of non limitative examples, with reference to the accompanying drawings in which.

DESCRIPTION OF THE PREFERRED EMBODIMENTS

Figure 1:
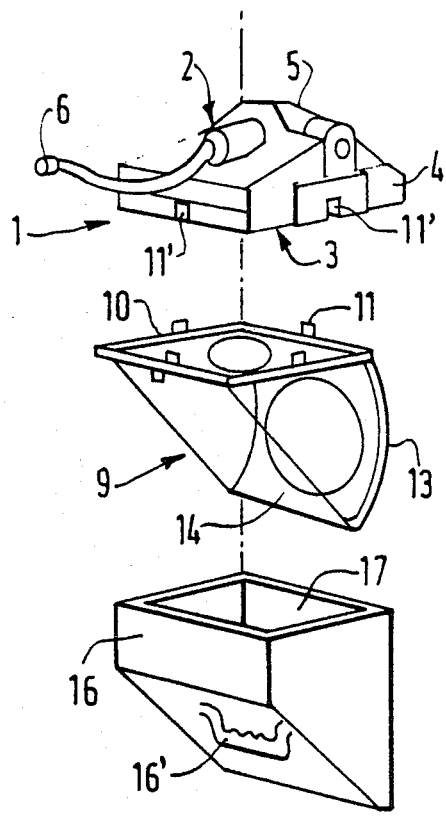
FIG. 1 is a schematical perspective view of a display device of the invention.
Figure 2:
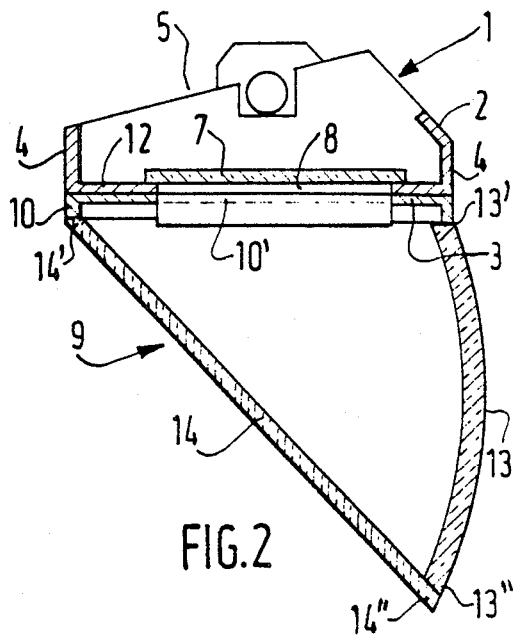
FIG. 2 is a schematical section of the image generating module and of the optical module in the coupled position.

In the example shown in FIGS. 1 and 2, the display device includes first of all an image generating module 1 with a support case 2 containing the elements usually used for forming images, and having means (not shown) for permanently fixing it to a vehicle.

This case 2 has a substantially flat coupling face 3 (here the lower face) edged with lateral faces 4. From the upper face 5 which has a complex shape extends a cable 6 providing the electric connections between the image generating module and the electric and electronic equipment on board the vehicle.

In this example, the light image forming means consist of a liquid crystal cell 7 closing a circular opening 8 formed in the coupling face 3 of case 2. Of course, this liquid crystal cell 7 is driven by a usual electronic circuit and may be illuminated by a light source housed inside the case.

On the coupling face 3 may be fitted an optical module 9 having a flat support 10 of the same dimensions as the coupling face 3 which has an orifice 10' through which pass the light rays emitted by the image generating module, and is provided with centering and locking studs 11 for cooperating with a rapid locking system 11' included on the lateral faces 4 of case 2. This locking system is more particularly designed so as to provide good application and correct centering of the coupling face 12 of support 10 on the coupling face 3 of case 2.

To the support element 10 is fixed an optical mount of "curved mixer" type including two partially transparent elements (mirrors) 13, 14, fixed together in a dihedral configuration, one of these elements being at least partially spherical.

For this, these two elements 13, 14 each have two straight parallel edges 13', 13''- 14', 14'', the edges 13'', 14'' of these elements 13, 14 being fixed together, for example by bonding, so as to form the angle of the dihedron, whereas the two opposite edges 13', 14' are fixed to two oppposite edges of support 10.

This mount is designed so that the light rays passing through the liquid crystal cell are reflected by the flat mirror 14 parallel to the optical axis of this spherical mirror 13 and in the direction thereof. With this spherical mirror 13, the observer may see the image formed by the cell, collimated for example to infinity, which is superimposed on the objects which he may see in his normal field of vision, through mirrors 13 and 14.

When the display device is not used, the optical module may be housed and stored in its protective and handling holder.

As can be seen in FIG. 1, this holder 16 which defines an inner volume substantially complementary to that of the optical module, has an opening 17 freeing the plane of the coupling face 12 of support 10 so as to make possible coupling or uncoupling of the optical module 9 to or from the image generating module 1 without having to remove the optical module 9 from holder 16.

Advantageously, holder 16 may further include means for rapid and readily disconnectable fixing thereof to the optical module 9, as well as a handle 16' facilitating handling thereof. This handle may possibly be hinged to the holder by means of a mechanical connection which may include means for actuating the holder/optical module and/or optical module/image generating module rapid fixing means.

Of course, the invention is not limited to a particular type of rapid fixing between the image generating module 1 and the optical module 9 and between this latter and holder 16.

Nevertheless, it provides a particularly advantageous solution in which the two rapid fixing systems interact so as to obtain automatic unlocking of the optical module 9 holder/16 coupling when the optical module 9 is locked to the image generating module 1.

Figure 3:
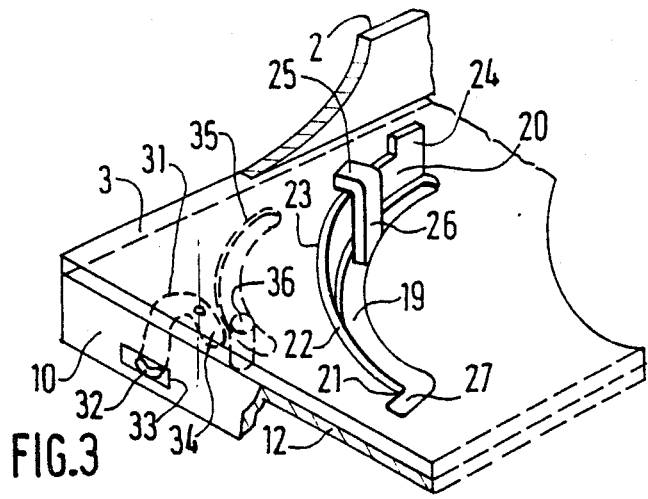
FIGS. 3 and 4 are schematical perspective views in partial section of a bayonet type locking device which may be used for coupling the optical module to the image generating module.
Figure 4:
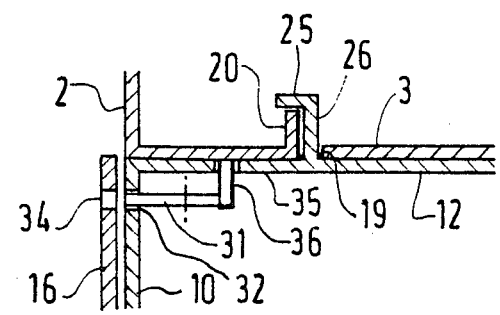

Such as illustrated in FIGS. 3 and 4, this solution uses an optical module/image generating module locking of bayonet type.

This system includes more particularly at least one oblong cut out 19 of circular shape formed in the coupling face 3 of the case 2, preferably in an angular region, and whose center of curvature coincides substantially with the center of face 3. This oblong cut out 19 is edged on one side by a flange 20 which projects inwardly of case 2 while forming successively, starting from one of the ends 21, an oblique ramp 22 then a level stretch 23 ending in a stop 24.

This flange 20 forms as it were a cam surface for cooperating with a bayonet 25 provided at the end of a stud 26 fast with the coupling face 12 of support 10.

During the coupling operation, this stud 26 is engaged through the oblong cut out 19 by means of a recess 27 formed at the end 21 of flange 20.

In this position, the two coupling faces 3, 12 applied one against the other are substantially coaxial but offset angularly with respect to each other.

Through a rotation support 10 is brought into the coupling position. During this rotation, the bayonet 25 engages on the flange 20 and exerts on the support a tractive force tending to apply the two coupling faces 3, 12 one against the other. The rotational travel of the support is interrupted by bayonet 25 reaching the stop 24, in which position the two coupling faces 3, 12 are in coincidence and are solidly locked together.

In this example, locking of the optical module 9 to its holder 16 is achieved by means of a crank lever 31 mounted for rotation with spring return in support 10, in the vicinity of stud 26 and one end 32 of which passing through a lateral orifice 33 of support 10 serves as a bolt cooperating with a keeper 34 formed in holder 16.

The other end 34 of lever 31 extends in line with an oblong cut out 35 of circular shape formed in a coupling face 12 and centered with respect thereto.

In addition, the coupling face 3 of case 2 is provided with a stud 36 which passes through the oblong cut out 35 during the optical module 9/image generating module 1 coupling phase.

The arrangement of these elements is provided so that at the end of rotation of the optical module 9 for locking it to the image generating module 1, stud 36 causes rotation of the crank lever 31 and thus causes the bolt to retract and, consequently, unlocking of holder 16.

The invention is not limited to a particular type of optical module, it however being understood that such a module must be compatible with the image generating module.

Figure 5:
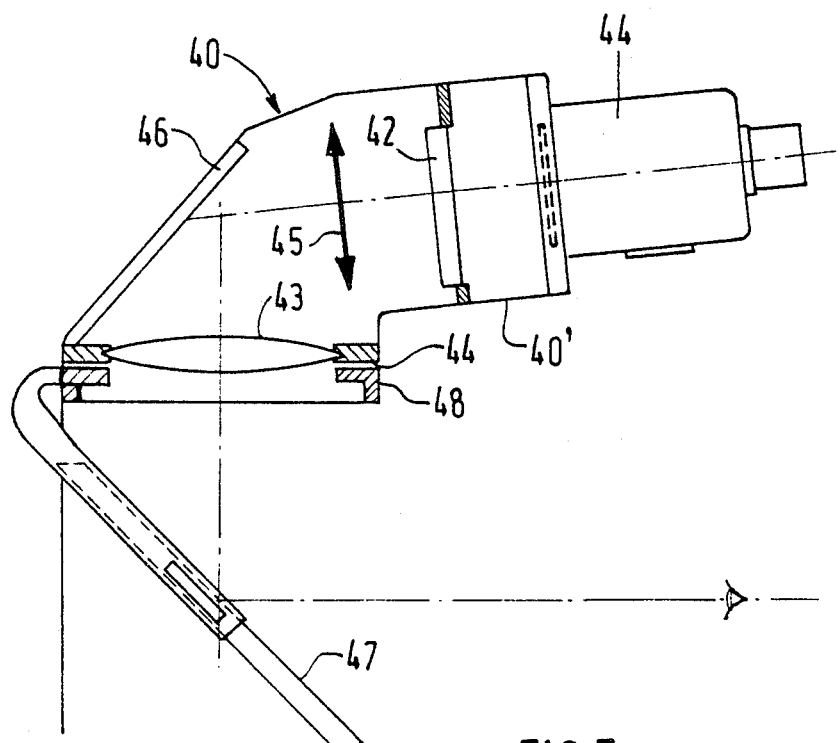
FIG. 5 is a schematical section of another embodiment of the display device of the invention.

Thus, FIG. 5 shows one embodiment of a display device in which the image generating module 40 incorporates the focusing elements of the optical fitting.

This module 40 includes, as in the example previously described, inside a support case 40', a light source 41 illuminating a liquid crystal cell 42. However, in this case, the light images formed by the liquid crystal cell 42 are collimated by an optical system including a focusing lens 43 mounted in the opening of the coupling face 44 of the case and which receives the light radiation emitted by cell 42 through a lens 45 and a mirror 46.

In this case, the optical module only comprises a semireflection mirror 47 extending obliquely with respect to the optical axis of lens 43, in the field of vision of the user, and carried by a support 48 which is coupled to case 40' through rapid locking means.

Of course, when the display device is not used, this optical module 47, 48 may be housed in an appropriate protective and handling holder.

What is claimed is:

1. A display device for superimposing, in a field of vision of a user, a synthetic light image formed on a partially reflecting mirror, by light rays emitted by an image generating means, said device comprising two dissociable modules, namely:
   (i) an image generating module including, inside a case, the said image generating means, and means for focusing said light rays, said case being provided with an orifice for the passage of said rays and said focusing means comprising at least a focusing lens which closes said orifice, and (ii) a removable optical module including at least said partially reflecting mirror, said modules being provided with coupling means for effecting a rapid disconnectable connection of said removable optical module on said image generating module.

2. The device as claimed in claim 1, wherein said coupling means consist of a bayonet coupling including at least one bayonet fast with one of said modules and designed so as to cooperate with a substantially circular ramp provided on the other module.

3. The device as claimed in claim 1, wherein the case of said image generating module has a flat coupling face and the optical module comprises a support element having a flat coupling face intended to be applied against the coupling face of said case, one of said coupling faces having at least one oblong cut out of circular shape edged on one side by a flange forming successively an oblique ramp, a level section and a stop, and the other coupling face including a stud having a bayonet adapted for engagement through said cut out so as to cooperate with said flange, during a relative rotary movement between the two modules, following which the bayonet comes to bear on said stop and the two modules are in a locked position.

4. A display device for superimposing, in a field of vision of a user, a synthetic light image formed on a partially reflecting mirror, by light rays emitted by an image generating means, said device comprising two dissociable modules, namely:

(i) an image generating module including inside a case the said image generating means, said case having a first plane coupling face provided with a first orifice for the passage of said rays;

(ii) a removable optical module comprising a flat support element on which said partially reflecting mirror is fixed, said flat support element having a second plane coupling face intended to be applied against the first coupling face, a second orifice for the passage of the light rays emitted by the image generating module, and means for fixing the partially reflecting mirror only in a limited portion of its peripheral, located near the support element, said modules being provided with coupling means for effecting a rapid disconnectable connection of said removable optical module on said image generating module, with a centering of the first orifice with respect to the second orifice.

* * * * *